US012182751B2

(12) United States Patent
Mohite et al.

(10) Patent No.: US 12,182,751 B2
(45) Date of Patent: Dec. 31, 2024

(54) SYSTEMS AND METHODS FOR DETECTING DISGUISED NON-PERFORMING ASSETS (NPAs) AND PREDICTING POTENTIAL NPAs IN AGRICULTURE

(71) Applicant: Tata Consultancy Services Limited, Mumbai (IN)

(72) Inventors: Jayantrao Mohite, Thane (IN); Srinivasu Pappula, Hyderabad (IN); Suryakant Ashok Sawant, Thane (IN); Vaibhav Sadashiv Lonkar, Pune (IN); Mariappan Sakkan, Chennai (IN); Ankur Pandit, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 188 days.

(21) Appl. No.: 17/813,371

(22) Filed: Jul. 19, 2022

(65) Prior Publication Data
US 2023/0090921 A1 Mar. 23, 2023

(30) Foreign Application Priority Data
Aug. 16, 2021 (IN) .............................. 202121037114

(51) Int. Cl.
*G06Q 10/0639* (2023.01)
*A01B 79/00* (2006.01)
(Continued)

(52) U.S. Cl.
CPC ..... *G06Q 10/06393* (2013.01); *A01B 79/005* (2013.01); *G06F 16/29* (2019.01);
(Continued)

(58) Field of Classification Search
CPC .. G06Q 10/06393; G06Q 50/02; G06Q 40/03; G06V 20/13; G06V 20/188;
(Continued)

(56) References Cited

U.S. PATENT DOCUMENTS

2018/0330435 A1 11/2018 Garg
2019/0050948 A1* 2/2019 Perry ...................... G06F 30/27
(Continued)

FOREIGN PATENT DOCUMENTS

| CA | 2917515 C * | 1/2021 | ........... A01B 79/005 |
| WO | WO2019/021313 A1 | 1/2019 | |
| WO | WO-2022175970 A1 * | 8/2022 | |

OTHER PUBLICATIONS

G. Sravan Kumar, S. Venkatramaphanikumar and K. Venkata Krishna Kishore, "Smart Farming—A Flexible Approach to Improve Crop Yield and Profit using Machine Learning Techniques," 2021 2nd International Conference for Emerging Technology (INCET), Belagavi, India, 2021, pp. 1-6 (Year: 2021).*

*Primary Examiner* — Crystol Stewart
(74) *Attorney, Agent, or Firm* — FINNEGAN, HENDERSON, FARABOW, GARRETT & DUNNER LLP

(57) ABSTRACT

Agriculture is impacted due to various parameters that results into heavy losses to the crops. Existing methods rely on manual inventories from fields and statistical results are prone to errors thus classification of crops may not be accurate. Present disclosure provides systems and methods for detection and prediction of disguised and potential non-performing assets (NPAs) in agriculture. Disguised NPAs detection involves, obtaining satellite data from sources and natural calamity, detecting of crop for past years, crop growth, estimating yields, market prices for individual years, AC zones, etc. wherein a generate performance score is generated for each field for classifying crop as disguised NPA. Predicting potential NPAs includes obtaining current season satellite data, data received from the fields via sensors, determining crop protocol being followed, forecast weather, estimating cumulative growth, feedback received from fields, projected yield, estimating (Continued)

crop losses, and then performance score is generated for predicting crops as potential NPA.

12 Claims, 2 Drawing Sheets

(51) Int. Cl.
| | |
|---|---|
| *G06F 16/29* | (2019.01) |
| *G06Q 50/02* | (2024.01) |
| *G06T 7/11* | (2017.01) |
| *G06V 10/75* | (2022.01) |
| *G06V 20/00* | (2022.01) |
| *G06V 20/10* | (2022.01) |
| *G06V 20/13* | (2022.01) |

(52) U.S. Cl.
CPC ............ *G06Q 50/02* (2013.01); *G06V 20/00* (2022.01); *G06V 20/13* (2022.01); *G06V 20/188* (2022.01); *G06T 7/11* (2017.01); *G06T 2207/10032* (2013.01); *G06T 2207/30188* (2013.01); *G06V 10/758* (2022.01)

(58) Field of Classification Search
CPC .... G06V 20/00; G06V 10/758; A01B 79/005; G06F 16/29; G06T 7/11; G06T 2207/10032; G06T 2207/30188
See application file for complete search history.

(56) References Cited

U.S. PATENT DOCUMENTS

| | | | |
|---|---|---|---|
| 2019/0179009 A1* | 6/2019 | Klein | G01S 13/9023 |
| 2019/0335674 A1* | 11/2019 | Basso | G06Q 50/02 |
| 2020/0034759 A1* | 1/2020 | Dumstorff | G06Q 50/02 |
| 2022/0309595 A1* | 9/2022 | Englard | G06Q 10/06315 |
| 2023/0005259 A1* | 1/2023 | Mohite | G06Q 50/02 |
| 2023/0091677 A1* | 3/2023 | Brown | G06Q 50/02 702/2 |
| 2023/0162296 A1* | 5/2023 | Xu | G06Q 10/06393 705/7.11 |

\* cited by examiner

SYSTEMS AND METHODS FOR DETECTING DISGUISED NON-PERFORMING ASSETS (NPAs) AND PREDICTING POTENTIAL NPAs IN AGRICULTURE

PRIORITY CLAIM

This U.S. patent application claims priority under 35 U.S.C. § 119 to: Indian Patent Application No. 202121037114, filed on Aug. 16, 2021. The entire contents of the aforementioned application are incorporated herein by reference.

TECHNICAL FIELD

The disclosure herein generally relates to analysis of crops in agriculture, and, more particularly, to systems and methods for detecting disguised non-performing assets (NPAs) and predicting potential NPAs in agriculture.

BACKGROUND

In underdeveloped and developing countries, most of the population is dependent on agriculture. For instance, India has a very small and fragmented landholding as opposed to other countries such as the United States (US) and other European countries where the landholdings are large in size. Most of the small and marginal farmers are availing credit facilities for agriculture and allied businesses. Both public and private sector banks are providing credit facilities to the farmers.

Broadly, agriculture is impacted due to climate change, pests/diseases, natural calamities, etc. that resulted into heavy losses to the crops. Hence many a times farmers are not able to repay the loan/credit to the banks and loans are going into non-performing assets (NPA). Financial institutions rely on inventory-based approaches where manual intervention is required and hinders the scalability of the method. On the other hand, there are some farmers who are knowingly not repaying the loan and waiting for the loan waiver. Meanwhile, such loans are classified as NPAs. There is no mechanism to figure out whether the NPA's are due to genuine or false reasons (i.e., disguised NPA). Existing methods rely on manual inventories from the fields and the statistical results are prone to errors.

SUMMARY

Embodiments of the present disclosure present technological improvements as solutions to one or more of the above-mentioned technical problems recognized by the inventors in conventional systems. For example, in one aspect, there is provided a processor implemented method for detecting disguised non-performing assets (NPA) and predicting potential NPA in agriculture. The method comprises obtaining, via one or more hardware processors, one or more satellite images corresponding to one or more crops; identifying a type of the one or more crops cultivated on a specific land based on the one or more satellite images; estimating, via the one or more hardware processors, temporal health of each of the one or more crops using the one or more obtained satellite images based on the identified type; obtaining, via the one or more hardware processors, information pertaining to agroclimatic (AC) zone, and natural calamity from one or more sources; estimating, via the one or more hardware processors, crop losses for each of the one or more crops based on value associated with occurrence of the natural calamity; estimating, via the one or more hardware processors, yield for each of the one or more crops based on at least one or more satellite images, and weather data being obtained; computing a first score as a function of the type of the one or more crops, the temporal health, the agroclimatic (AC) zone, the natural calamity, the crop losses, the estimated yield, and associated market returns being obtained; and detecting the one or more crops as one of (i) a first non-performing asset type, or (ii) a second non-performing asset type based on the computed first score.

In an embodiment, the method further comprises periodically performing the steps of: monitoring growth of the one or more crops based on at least one of the one or more satellite images and sensory information obtained from one or more sensors; monitoring crop protocol associated with the one or more crops, wherein the crop protocol comprises a set of system generated instructions for cultivating the one or more crops; estimating an expected yield for each of the one or more crops based on at least one of (i) the one or more satellite images, (ii) weather data, (iii) associated soil information, and (iv) associated crop information; and computing a second score as a function of at least one of (i) the monitored growth, (ii) the monitored crop protocol, and (iii) the estimated expected yield.

In an embodiment, the second score is further based on (i) crop losses due to natural calamity, and (ii) expected return derived from the estimated expected yield.

In an embodiment, the method further comprises predicting the one or more crops as a potential non-performing asset based on the second score.

In another aspect, there is provided a system for detecting disguised non-performing assets (NPA) and predicting potential NPA in agriculture. The system comprises a memory storing instructions; one or more communication interfaces; and one or more hardware processors coupled to the memory via the one or more communication interfaces, wherein the one or more hardware processors are configured by the instructions to: obtain one or more satellite images corresponding to one or more crops; identify a type of the one or more crops cultivated on a specific land based on the one or more satellite images; estimate temporal health of each of the one or more crops using the one or more obtained satellite images based on the identified type; obtain information pertaining to agroclimatic (AC) zone, and natural calamity from one or more sources; estimate crop losses for each of the one or more crops based on value associated with occurrence of the natural calamity; estimate yield for each of the one or more crops based on at least one or more satellite images, and weather data being obtained; compute a first score as a function of the type of the one or more crops, the temporal health, the agroclimatic (AC) zone, the natural calamity, the crop losses, the estimated yield, and associated market returns being obtained; and detect the one or more crops as one of (i) a first non-performing asset type, or (ii) a second non-performing asset type based on the computed first score.

In an embodiment, the one or more hardware processors are further configured by the instructions to: periodically perform the steps of: monitoring growth of the one or more crops based on at least one of the one or more satellite images and sensory information obtained from one or more sensors; monitoring crop protocol associated with the one or more crops, wherein the crop protocol comprises a set of system generated instructions for cultivating the one or more crops; estimating an expected yield for each of the one or more crops based on at least one of (i) the one or more satellite images, (ii) weather data, (iii) associated soil information, and (iv) associated crop information; and computing a second score as a function of at least one of (i) the monitored growth, (ii) the monitored crop protocol, and (iii) the estimated expected yield.

In an embodiment, the second score is further based on (i) crop losses due to natural calamity, and (ii) expected return derived from the estimated expected yield.

In an embodiment, the one or more hardware processors are further configured by the instructions to predict the one or more crops as a potential non-performing asset based on the second score.

In yet another aspect, there are provided one or more non-transitory machine-readable information storage mediums comprising one or more instructions which when executed by one or more hardware processors cause a method for detecting disguised non-performing assets (NPA) and predicting potential NPA in agriculture. The method comprises obtaining, via one or more hardware processors, one or more satellite images corresponding to one or more crops; identifying a type of the one or more crops cultivated on a specific land based on the one or more satellite images; estimating, via the one or more hardware processors, temporal health of each of the one or more crops using the one or more obtained satellite images based on the identified type; obtaining, via the one or more hardware processors, information pertaining to agroclimatic (AC) zone, and natural calamity from one or more sources; estimating, via the one or more hardware processors, crop losses for each of the one or more crops based on value associated with occurrence of the natural calamity; estimating, via the one or more hardware processors, yield for each of the one or more crops based on at least one or more satellite images, and weather data being obtained; computing a first score as a function of the type of the one or more crops, the temporal health, the agroclimatic (AC) zone, the natural calamity, the crop losses, the estimated yield, and associated market returns being obtained; and detecting the one or more crops as one of (i) a first non-performing asset type, or (ii) a second non-performing asset type based on the computed first score.

In an embodiment, the method further comprises periodically performing the steps of: monitoring growth of the one or more crops based on at least one of the one or more satellite images and sensory information obtained from one or more sensors; monitoring crop protocol associated with the one or more crops, wherein the crop protocol comprises a set of system generated instructions for cultivating the one or more crops; estimating an expected yield for each of the one or more crops based on at least one of (i) the one or more satellite images, (ii) weather data, (iii) associated soil information, and (iv) associated crop information; and computing a second score as a function of at least one of (i) the monitored growth, (ii) the monitored crop protocol, and (iii) the estimated expected yield.

In an embodiment, the second score is further based on (i) crop losses due to natural calamity, and (ii) expected return derived from the estimated expected yield.

In an embodiment, the method further comprises predicting the one or more crops as a potential non-performing asset based on the second score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Agriculture is impacted due to climate change, pest/diseases, natural calamities, etc. that results into heavy losses to the crops. Hence many a times farmers are not able to repay the loan/credit to the banks and loans are going into non-performing assets (NPA). There are no mechanisms in place to detect the disguised NPA (willingly avoids paying the loan even after good income), and to further detection potential NPA in agriculture.

Embodiments of the present disclosure provide systems and methods that utilize current season data, forecast weather, crop protocol. More specifically, system and method are provided for detection and prediction of disguised and potential NPA in agriculture. To detect the disguised NPA's, historical satellite data from various sources such as Sentinel-1, 2, Landsat-5, 7, 8, MODIS, etc., plot specific information such as GPS boundary, information available with the banks, etc. are used. However, to predict the potential NPA, the system of the present disclosure uses current season satellite data, data received from the fields via sensors, information on crop protocol, forecast weather etc. In the present disclosure, detection of disguised NPA mainly involves, detection of crop for past years, crop growth, information on natural calamity, estimated yields, market prices for individual years, agro-climatic zones, etc. Combination of these parameters are used to generate performance score for each field. Further, classification into disguised NPA is carried out based on performance score. System and method of the present disclosure further predict potential NPA using the current season information on the crop, cumulative growth, feedback received from the field, projected yield, losses due to natural calamities, forecast weather, etc. Separate scores are generated for plots which are following the practices suggested by Doubling Farmers' Income (DFI) and once who are not following the suggestions on a crop, crop protocol, etc. Information on performance score based on historical data is also utilized to generate current performance score which is used to predict the potential NPA.

Figure 1:
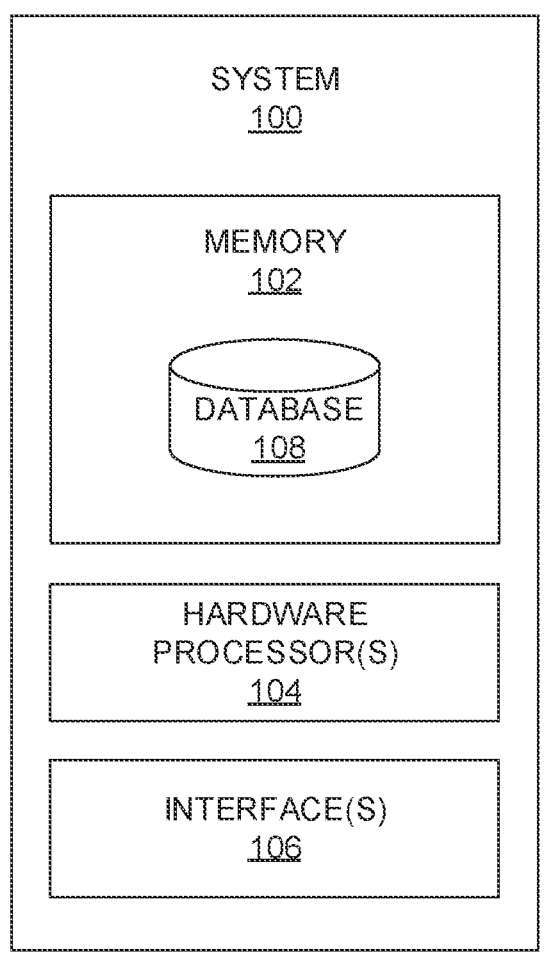
FIG. 1 illustrates an exemplary block diagram of a system for detecting disguised non-performing assets (NPA) and predicting potential NPA in agriculture, in accordance with an embodiment of the present disclosure.
Figure 2:
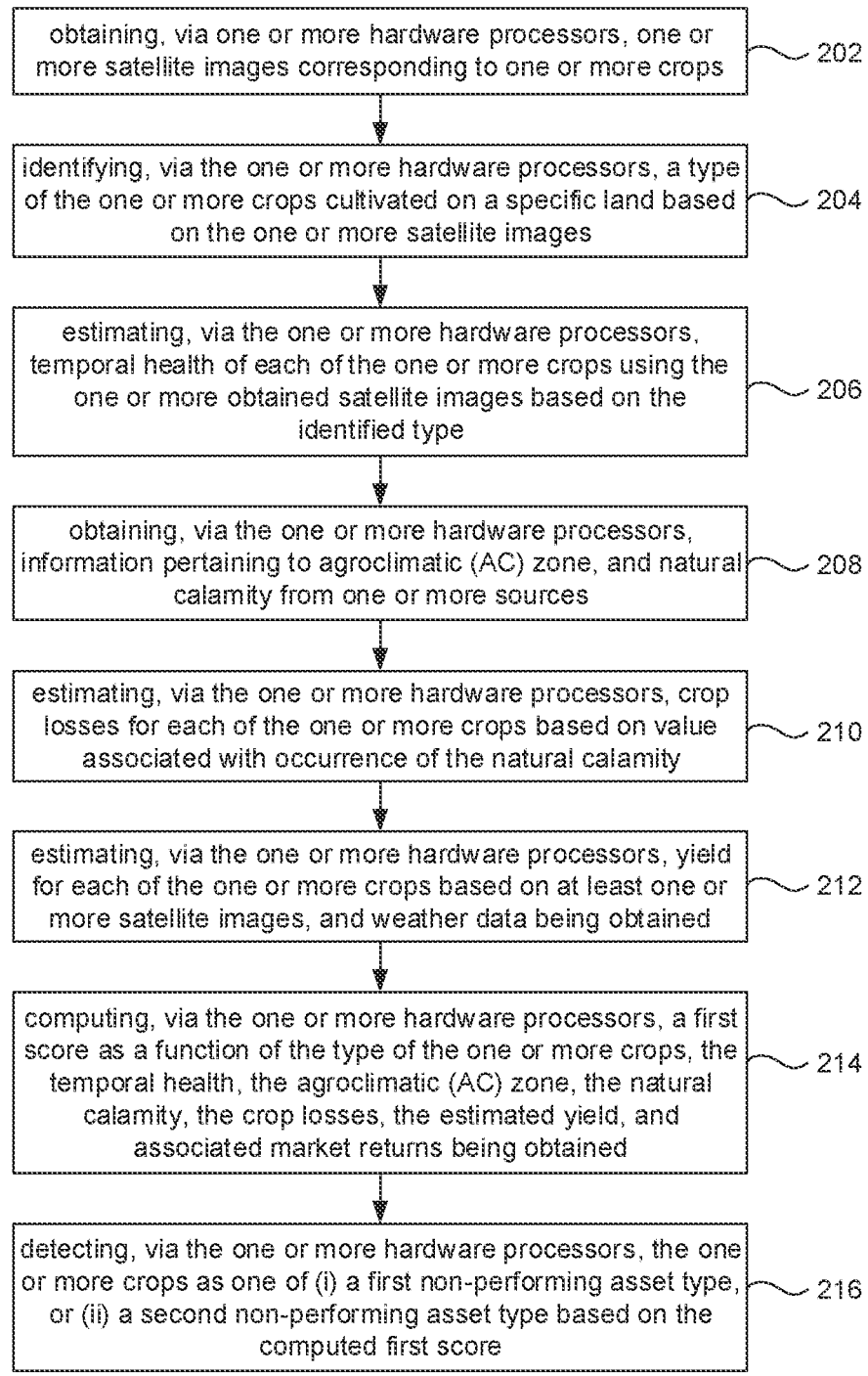
FIG. 2 illustrates an exemplary flow diagram of a method for detecting disguised non-performing assets (NPA) and predicting potential NPA in agriculture, using the system of FIG. 1, in accordance with an embodiment of the present disclosure.

Referring now to the drawings, and more particularly to FIGS. 1 through 2 the figures, there are shown preferred embodiments and these embodiments are described in the context of the following exemplary system and/or method.

FIG. 1 illustrates an exemplary block diagram of a system 100 for detecting disguised non-performing assets (NPA) and predicting potential NPA in agriculture, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices (e.g., mobile communication device and/or smart phones), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to one or more satellite images corresponding to one or more crops, crop type cultivated on a specific land region, temporal health being estimated for each crop, information pertaining to agroclimatic (AC) zone, and natural calamity from one or more sources (e.g., sources may include but are not limited to internet websites, meteorological departments, data from various internet portals as known in the art, and the like), crop losses, yield, associated market returns, and the like. The memory 102 further stores information corresponding to periodic growth of crops, expected yield, and various scores computed for classifying the crop as potential NPA or disguised NPA. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, illustrates an exemplary flow diagram of a method for detecting disguised non-performing assets (NPA) and predicting potential NPA in agriculture, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram of FIG. 2. In an embodiment of the present disclosure, at step 202, the one or more hardware processors 104 obtain one or more satellite images corresponding to one or more crops. In an embodiment of the present disclosure, at step 204, the one or more hardware processors 104 identify a type of the one or more crops cultivated on a specific land based on the one or more satellite images. For instance, the system 100 may employ and execute one or more machine learning (ML) algorithms (e.g., as known in the art ML algorithms) and/or deep learning/DL algorithm(s) for crop detection. The ML/DL algorithms are trained with dataset of satellite images wherein crops in the images may be identified and annotated (by subject matter experts) accordingly, in one example embodiment. In some scenarios, specific pixels may be identified by the SME and accordingly crops may be detected in the identified pixels by using the ML/DL algorithm(s). Examples of ML/DL algorithms may include but are not limited to Random Forest, Support Vector Machine (SVM), Convolutional Neural Networks, and the like. For instance, type of crop may comprise, but are not limited to rice, wheat, sugarcane, grapes, and the like. In an embodiment, if the crop detected from satellite image and provided by the farmer to the bank is same then value=1 is assigned, else value=2 is assigned.

In an embodiment of the present disclosure, at step 206, the one or more hardware processors 104 estimate temporal health of each of the one or more crops using the one or more obtained satellite images based on the identified type. For instance, in the present disclosure, indices estimated from satellite data are used to determine the health at each time instance during crop season. Here the values may include poor, average, good health, etc. or score between 0 and 1 where 0 indicates very poor health and 1 indicates ideal health.

Temporal crop health is determined using the satellite images. For each time instance, when the satellite image is available, number of indices are estimated e.g., Normalized Difference Vegetation Index (NDVI). Using the field boundary available for target plot, NDVI for that plot was obtained and compared with average of NDVI for the same crop from the surrounding region. The score is estimated using the below expression:

$$\text{Crop Health/temporal health of crop}(t1) = [\text{NDVI for Plot}(t1) - \text{Min NDVI for region}(t1)] / [\text{Max NDVI for region}(t1) - \text{Min NDVI for region}(t1)]$$

Using the above formula, crop health at any time instance has value between 0 to 1. Values towards 1 indicates excellent growth, however values towards 0 indicates poor growth.

In an embodiment of the present disclosure, at step 208, the one or more hardware processors 104 obtain information pertaining to agroclimatic (AC) zone, and natural calamity from one or more sources. Agroclimatic (AC) zone, and natural calamity are obtained from Internet (or sources as known in the art such as weather-related websites, online/offline meteorological departments, and the like) wherein the values for AC zone can be between x and y, where x is 1 and y is 15, in one example embodiment of the present disclosure. Each value denotes a specific AC zone. The above exemplary ranges of x and y shall not be construed as limiting the scope of the present disclosure. If the AC zone is suitable for the cultivated crop, then value=1 is assigned, else value=2 is assigned. Likewise, if Natural calamity occurs during the crop cultivation, then value=1 is assigned, else value=0 is assigned.

In an embodiment of the present disclosure, at step 210, the one or more hardware processors 104 estimate crop losses for each of the one or more crops based on value associated with occurrence of the natural calamity. Information on date and type of event is obtained from the Internet (or data available from sources such as but not limited to internet weather related websites, meteorological departments, sources as known in the art, and the like), however losses are estimated from the satellite image. Values for Natural calamity occurrence are Yes or No, if Yes losses are estimated from the satellite data which take the values between 0 to 100, where 0 denotes no loss whereas 100 indicates total crop has been damaged. The above exemplary ranges of 0 and 100 shall not be construed as limiting the scope of the present disclosure.

Say that natural calamity such as cyclone has affected coastal region of AP during the rice crop growth season. The system 100 has this information related to the date/week when the cyclone has affected the target plot/crop. Data from the satellite images has been accessed before the cyclone event and after the cyclone event. Two pairs of NDVI were estimated, one for average of NDVI before the cyclone event (NDVIbef) and another for the average of NDVI after the cyclone event (NDVIaft). Same parameters can be extracted for previous year when there was no any natural calamity and for the same period.

Say those are NDVIbef(nor) and NDVIaft(nor)

$$NDVIC(event) = NDVIbef - NDVIaft$$

$$NDVIC(nor) = NDVIbef(nor) - NDVIaft(nor)$$

$$NDVI\ Diff = NDVIC(event) - NDVIC(nor)$$

Further the layer has been normalized to have the defined range between 0 and 100 using the below $$Crop\ Loss = [NDVI\ Diff(p) - Min\ NDVI\ Diff]/[Max\ NDVI\ Diff - Min\ NDVI\ Diff]$$

NDVI Diff (p) is the NDVI Diff value for a given pixel

Min NDVI Diff is the minimum value from NDVI Diff layer (also referred as difference in at least 2 satellite images depicting crop(s))

Max NDVI Diff is the maximum value from NDVI Diff layer

Values towards 100 indicate severe loss however values towards 0 indicate no loss. The above description can be better understood by way of following example:

NDVIC(event)=NDVIbef−NDVIaft=0.6−0.4=0.2, event refers to natural calamity such as cyclone, hailstorm, and the like NDVIC(nor)=NDVIbef(nor)−NDVIaft(nor)=0.6−0.515=0.085, wherein nor refers to Normal.

$$NDVI\ Diff = NDVIC(event) - NDVIC(nor) = 0.2 - 0.085 = 0.115$$

Further the layer has been normalized to have the defined range between 0 and 100 using the below $$Crop\ Loss = [NDVI\ Diff(p) - Min\ NDVI\ Diff]/[Max\ NDVI\ Diff - Min\ NDVI\ Diff] = (Values\ towards\ 1\ indicate\ severe\ loss\ however\ values\ towards\ 0\ indicate\ no\ loss$$

$$Crop\ Loss = (0.115 - 0.1)/(0.2 - 0.1) = 0.15.$$

In an embodiment of the present disclosure, at step 212, the one or more hardware processors 104 estimate yield for each of the one or more crops based on at least one or more satellite images, and weather data being obtained. Weather data is obtained from sources such as but are not limited to Internet websites, meteorological departments, information on weather from various internet portals as known in the art, and the like). Yield is estimated from the satellite data. Empirical/Semi-empirical/process-based model are used by the system 100 for yield estimation using satellite, weather, and other datasets. For example, values will be continuous and vary with crop and AC zone. For example, rice for AP has values between 4500-7500 kg/ha, in one embodiment of the present disclosure.

Yield is estimated using the satellite and weather data. Various satellite indices such as Normalized Difference Vegetation Index (NDVI), Normalized Difference Water Index (NDWI), Leaf Area Index (LAI) etc. are estimated/obtained from satellite data. Moreover, weather variables such as Accumulated Growing Degree Days (A-GDD), rainfall can be used for empirical yield model development.

Soil variables include soil type, soil texture, etc.

It is to be noted that variables can be changed/added/removed based on the crop and such usage of variables shall not be construed as limiting the scope of the present disclosure. Simplest yield model using the one dependent variable can be represented as below $$Yield = a + b*NDVImax$$

Here NDVImax is the maximum NDVI for the season for that plot

Yield is the estimated/predicted yield a and b are the parameters derived while fitting the empirical model. The above is better understood by way of following example:

$$Yielda = a + b*NDVImax = 2500 + (4000*0.8) = 5700\ kg/ha$$

Max Yield for the region=6000 kg/ha
Min Yield for the region=3000 kg/ha $$Yield = (Yielda - Min\ Yield)/(Max\ Yield - Min\ Yield) = (5700 - 3000)/(6000 - 3000) = 0.9$$

In an embodiment of the present disclosure, at step 214, the one or more hardware processors 104 compute a first score as a function of the type of the one or more crops, the temporal health, the agroclimatic (AC) zone, the natural calamity, the crop losses, the estimated yield, and associated market returns being obtained. Data obtained from AgMarkNet, NCDEX, internet etc. provide information on market returns. Again, the values tend to be continuous and vary with crop, its quality and time of arrival in the market.

$$Score(also\ referred\ as\ first\ score) = f(crop, temporal\ health, crop\ loss, AC\ zone, Yield, Market\ Returns)$$

At a given time instance, Market returns obtained are 20550

Maximum returns on the same day=21000

Minimum returns on the same day=18000

Market returns=(Obtained Market Returns−Minimum returns)/(Maximum returns−Minimum Returns)= (21000−20550)/(21000−18000)=0.85

Here for each of these parameter values are converted to the scale of 0 to 1 by simple normalization and post normalization weighted summation is calculated. Final score value is in the range of 0 and 1.

In an embodiment of the present disclosure, at step 216, the one or more hardware processors 104 detect the one or more crops as one of (i) a first asset type, or (ii) a second asset type based on the computed first score. The first asset type and the second asset type are a non-performing asset, or a normal asset (e.g., performing asset or non-disguised asset). Here, 0 indicates disguised NPA, however 1 indicates Non-Disguised NPA or non-disguised asset, in one example embodiment of the present disclosure. The expression 'Disguised NPA' herein refers to an area or a plot of land (on which loan is availed) wherein the crop(s) is/are cultivated, and the area/land was managed better with good return still the loan was not paid willfully, in one embodiment of the present disclosure. Such plot of land is defined as disguised NPA. The steps 214 and 216 are better understood by way of following expression for first score computation and detection of first asset type or the second asset type.

Score($C$)=$f$(Crops,temporal health,crop losses,AC zone,Natural Calamity,Yield,Market Returns).

Therefore, Score=(1+0.9+1−0−0.15+0.9+0.85+1)/8=5.80/8=0.725.

Weights are considered to be 1 for all parameters, which might change as per crop, in one example embodiment. Such weight assignment shall not be construed as limiting the scope of the present disclosure. If the score is more than 0.5, then assign score=1 which indicates non-disguised NPA, in one example embodiment of the present disclosure. If the score is less than 0.5 then assign score=0 which indicates disguised NPA, in another example embodiment of the present disclosure.

Below Table 1 provides exemplary details of crops, temporal health, crop losses, AC zone, Natural Calamity, Yield, Market Returns, and detection as first asset or second asset type.

Here, Same crop=crop detected from satellite and crop mentioned for the target plot are same Different crop=crop detected from satellite and crop mentioned for the target plot are Different.

TABLE 1

| Sl. No. | Crop | Health | AC Zone | Calamity | Losses | Yield | Market Returns | Loan Repayment | Disguised NPA |
|---|---|---|---|---|---|---|---|---|---|
| 1 | Same | Good | F | No | No | High | Good | Yes | No |
| 2 | Same | Good | F | No | No | High | Good | No | Yes |
| 3 | Different | Medium | NF | No | Yes | Average | Average | No | Yes |
| 4 | Same | Good | F | Yes | Yes | Low | Low | No | No |
| 5 | Same | Poor | F | No | Yes | Average | Average | No | Yes |

In the above table, Loan Repayment is obtained as Loan repaid=1 and Loan not paid or partially paid=0.

Above Table 1 is better understood by way of corresponding values as depicted in Table 2:

TABLE 2

| Sl. No. | Crop | Health | AC Zone | Calamity | Losses | Yield | Market Returns | Loan Repayment | Disguised NPA |
|---|---|---|---|---|---|---|---|---|---|
| 1 | 1 | 0.9 | 1 | 0 | 0.15 | 0.9 | 0.85 | 1 | 1 |
| 2 | 1 | 0.85 | 1 | 0 | 0.2 | 0.13 | 0.2 | 0 | 0 |
| 3 | 2 | 0.55 | 2 | 0 | 0.75 | 0.6 | 0.45 | 0 | 0 |
| 4 | 1 | 0.65 | 1 | 1 | 0.85 | 0.65 | 0.55 | 0 | 1 |
| 5 | 1 | 0.1 | 1 | 0 | 0.8 | 0.5 | 0.45 | 0 | 0 |

Crop 1=crop detected from satellite and crop mentioned for the target plot are same and 2=crop detected from satellite and crop mentioned for the target plot are Different Health values towards 1 are good health and towards 0 are poor health AC Zone 1 is favorable for crop and 2 is non-favorable for crop Calamity 0 no calamity and 1 is the occurrence of calamity Losses values towards 1 are high losses and towards 0 are no losses Yield values towards 1 are best yield and towards 0 are poor yield Market returns values towards 1 are best returns and towards 0 are poor returns Loan Repayment 1 loan repaid and 0 not paid Disguised NPA 0 indicates Disguised NPA, however 1 indicates Non-disguised NPA As mentioned above, it is to be understood by a person having ordinary skill in the art or person skilled in the art that parameters such as health, yield, losses, market returns can have continuous values as well. Values mentioned in the above table (categorical) are for illustration purpose only and for better understanding of the embodiments described herein. Such examples shall not be construed as limiting the scope of the present disclosure.

The method of FIG. 2 further comprises predicting the one or more crops as a potential non-performing asset. The steps involving prediction of crops as potential non-performing asset are periodically performed (e.g., every hour, every day, every week, every month, every quarter, every year and so on.) depending upon an output observed at each corresponding step. Such periodic performing of steps may be configured by the system 100 (or in the system 100). The steps of predicting crops as potential non-performing asset are described below by way of exemplary description. For instance, at first step, growth of the one or more crops is monitored based on at least one of the one or more satellite images and sensory information obtained from one or more sensors. As mentioned, the step of monitoring is a continuous activity and values/information are updated at various time intervals say t1, t2, t3 . . . tn, where to here is end of season. Growth herein may refer to crop health which is estimated using satellite image data wherein the values may be denoted as poor, average, good health, etc. or the score may be between 0 and 1. 0 indicates very poor health and 1 may indicate an ideal health.

Upon monitoring the crop growth, crop protocol associated with the one or more crops is monitored. For instance, the crop protocol comprises a set of system generated instructions for cultivating the one or more crops. Using the image processing of images received from the fields, pest/disease detection is carried out by the system 100. This is to monitor and suggest the precautionary measures (also referred as instructions or crop protocol and interchangeably used herein). The instructions are system generated instructions which are pre-generated or dynamically generated in real-time, in one embodiment of the present disclosure. The instructions may be empirically determined and generated by the system 100 based on historical pattern learnt over a period of time by the system 100, in another embodiment of the present disclosure. The values correspond to a type and severity of detected pest/disease, in one example embodiment. Further, instructions include based on the soil utilized to harvest, few suggestions can be made by the system 100 either to continue or change the soil type based on soil and moisture information gathered from one or more environmental sensors (e.g., sensors known in the art). For optimal soil moisture monitoring and the system 100 suggests the farmers time/day of irrigation for optimal harvesting of crops. Further, instructions may be in the form of advice wherein with each of the monitored parameters, personalized advice can be provided to the farmers such as (i) crop health wherein based on crop health of the fields, which portions of the fields (locations/hotspots) needs the monitoring, (ii) pest/disease detection wherein based on the detected pest/disease and its severity, which chemicals/pesticides to use along with quantity, and (iii) soil moisture sensors based on actual soil moisture measurement, suggestions on when and how to irrigate. Additionally, the crop protocols may include feedback. The feedback may include but are not limited to (a) how the activities are performed, are captured by following methods, (b) based on satellite image data, the system 100 identifies if farmer has taken certain measures to minimize/remove the hotspots and (c) using hyperspectral data the system 100 identifies if advice on pest/disease has been followed or any further feedback is to be provided. Feedback further includes identification by the system 100 if irrigation was provided at right time and with required quantity.

One the instructions are provided, and crop protocol is monitored, an expected yield for each of the one or more crops is estimated based on at least one of (i) the one or more satellite images, (ii) weather data, (iii) associated soil information, and (iv) associated crop information. The associated crop information includes crop variety, crop growth stage, etc. Yield is estimated from the satellite data. Empirical/Semi-empirical/process-based model are used by the system 100 for yield estimation using satellite, weather, and other datasets. For example, values will be continuous and vary with crop and AC zone. For example, rice for AP has values between 4500-7500 kg/ha, in one embodiment of the present disclosure.

Yield is estimated using the satellite and weather data. Various satellite indices such as Normalized Difference Vegetation Index (NDVI), Normalized Difference Water Index (NDWI), Leaf Area Index (LAI) etc. are estimated from satellite data.

Moreover, weather variables such as Accumulated Growing Degree Days (A-GDD), rainfall can be used for empirical yield model development.

Soil variables include soil type, soil texture etc

[please note the variables can be changed/added/removed based on the crop].

Simplest yield model using the one dependent variable can be represented as below $$\text{Yield} = a + b * \text{NDVImax}$$

Here NDVImax is the maximum NDVI for the season for that plot

Yield is the estimated/predicted yield a and b are the parameters derived while fitting the empirical model.

Upon estimating the expected yield, a second score is computed as a function of at least one of (i) the monitored growth, (ii) the monitored crop protocol, and (iii) the estimated expected yield. The second score is further based on (i) crop losses due to natural calamity, and (ii) expected return derived from the estimated expected yield. The one or more crops are then identified as a potential non-performing asset based on the second score. The expression 'Potential NPA' herein refers to an area or the plot of land (on which loan is availed) wherein the crop is cultivated or is attempted for growing of crop and is having a chance of converting to Non-Performing Assets, in one embodiment of the present disclosure. The second score is computed similarly as shown above for the first score computation. More particularly, the identification of crops as potential non-performing asset may be based on the second score that is computed as function of weather, crop growth, crop protocol, natural calamity, expected yield, expected market returns, and the like. Weather may include variables such as temperature, humidity, rainfall, wind speed, and the like. Crop growth monitoring includes monitoring crops using the satellite data, sensors, participatory sensing devices, and the like. Crop protocol includes sequence of personalized practices (advice) suggested to the farmers. Natural Calamity includes events such as flood, hailstorm, cyclone, etc. occurred during the crop growth season. Expected Yield includes predicted yield using satellite, weather and other parameters monitored during crop growth season. Expected market returns includes predicted market price based on yield, quality, market arrival time, and the like. Below Table 3 provides exemplary details of crops, Crop, sowing week, crop health, advice, followed feedback, projected yield, expected returns, classification of crop as disguised NPA Earlier or potential NPA, and the like.

Here, same crop=crop detected from satellite and crop mentioned for the target plot are same.

Different crop=crop detected from satellite and crop mentioned for the target plot are Different.

AC Zone 1 is favorable for crop and 2 is non-favorable for crop

Advice followed towards 1 is fully followed and towards 0 is advice not at all followed Feedback towards 1 extremely good and towards 0 is bad Projected Yield values towards 1 are best yield and towards 0 are poor yield Expected Market returns values towards 1 are best returns and towards 0 are poor returns Disguised NPA 0 is Disguised NPA and 1 is Non-Disguised NPA Potential NPA 0 is Potential NPA and 1 is Non-Potential NPA In other words, the above may be better understood by way of following description:

Crop: Same as described above in steps 202 and 204.

Sowing week: If sowing week is favorable as per standards, then value=1 is assigned, else value=0 is assigned.

Crop Health/Temporal health: The health of the crop(s) is estimated as described above in step 206.

Advice Followed (also referred as crop protocol associated with the one or more crops, wherein the crop protocol comprises a set of system generated instructions (also referred as set of instructions generated by system 100 or crop protocol or advice or precautionary measures or suggestions and may be interchangeably used herein) for cultivating the one or more crops): Based on the number of

TABLE 3

| SI. No. | Crop | Sowing Week | Crop Health | Advice Followed | Feedback | Projected Yield | Expected Returns | Disguised NPA Earlier (C) | Potential NPA |
|---|---|---|---|---|---|---|---|---|---|
| 1 | Same | F | Good | Yes | Good | Good | Good | No | No |
| 2 | Same | F | Average | No | Average | Average | Low | Yes | Yes |
| 3 | Same | NF | Poor | No | Poor | Low | Low | Yes | Yes |
| 4 | Different | F | Good | Yes | Good | Good | Good | No | No |
| 5 | Different | NF | Poor | No | Poor | Low | Low | Yes | Yes |

SI. No 1, 2, and 3 are applicable for a cultivation of suggested crop, and SI. No 4 and 5 are applicable for a cultivation of different crop. It is to be understood by a person having ordinary skill in the art or person skilled in the art that parameters such as health, advice, feedback are estimated/obtained at multiple time instances, however projected yield, and expected returns can have continuous values as well.

Above Table 3 is better understood by way of corresponding values as depicted in Table 4:

suggestions followed by the farmers, the score is assigned. For instance, the system 100 say provided 10 suggestion and out of which 9.5 suggestions are followed, that plot generates an advice score=0.95.

Feedback: The score is assigned based on the feedback. Suppose say feedback was obtained for about 10 different parameters/values and 8.5 parameters are in-line with standard(s), then feedback score=0.85 may be assigned/given Yield: The yield of the crop(s) is estimated as described above in step 212.

TABLE 4

| SI. No. | Crop | Sowing Week | Crop Health | Advice Followed | Feedback | Projected Yield | Expected Returns | Disguised NPA Earlier (C) | Potential NPA |
|---|---|---|---|---|---|---|---|---|---|
| 1 | 1 | 1 | 0.85 | 0.95 | 0.75 | 0.75 | 0.7 | 1 | 1 |
| 2 | 1 | 1 | 0.55 | 0.35 | 0.48 | 0.5 | 0.35 | 0 | 0 |
| 3 | 1 | 2 | 0.1 | 0.45 | 0.15 | 0.2 | 0.2 | 0 | 0 |
| 4 | 2 | 1 | 0.75 | 0.85 | 0.85 | 0.95 | 0.85 | 1 | 1 |
| 5 | 2 | 2 | 0.2 | 0.1 | 0.2 | 0.3 | 0.25 | 0 | 0 |

The above method of predicting potential non-performing asset based on the second score may be better understood by way of following non-construing examples:

Crop 1=crop detected from satellite and crop mentioned for the target plot are same and 2=crop detected from satellite and crop mentioned for the target plot are Different Sowing week 1 is favorable for crop and 2 is non-favorable for crop Expected returns: The expected returns is estimated as described above in step 214.

Disguised NPA earlier: Data obtained from steps 202 till 216.

Score: For the sake of brevity, the score computation is not iterated. It is to be understood by a person having ordinary skill in the art or person skilled in the art that score is computed as described above in step 216 wherein the score is referred as the second score which is computed as a function of at least one of (i) the monitored growth, (ii) the monitored crop protocol, and (iii) the estimated expected yield. Examples shown in Tables 1, 2, 3 and 4 shall not be construed as limiting the scope of the present disclosure.

As mentioned above, conventionally/currently, agriculture is impacted due to various parameters that resulted into heavy losses to the crops. Existing methods rely on manual inventories from fields and statistical results are prone to errors thus classification of crops may not be accurate. Present disclosure provides systems and methods for detection and prediction of disguised and potential non-performing assets (NPAs) in agriculture. Disguised NPAs detection involves, obtaining satellite data from sources and natural calamity, detecting of crop for past years, crop growth, estimating yields, market prices for individual years, AC zones, etc. wherein a generate performance score is generated for each field for classifying crop as disguised NPA. Predicting potential NPAs includes obtaining current season satellite data, data received from the fields via sensors, determining crop protocol being followed, forecast weather, estimating cumulative growth, feedback received from fields, projected yield, estimating crop losses, and then performance score is generated for predicting crops as potential NPA.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
obtaining, via one or more hardware processors, one or more satellite images corresponding to one or more crops;
identifying, via the one or more hardware processors, a type of the one or more crops cultivated on a specific land based on the one or more satellite images using one or more machine learning (ML) or deep learning (DL) algorithms, wherein the one or more ML or DL algorithms are trained with a dataset of the one or more satellite images where the one or more crops in the dataset are identified and annotated, wherein specific pixels in the dataset of the one or more satellite images are identified to train the one or more ML or DL algorithms to identify the type of the one or more crops cultivated in the specific pixels, and wherein if the type of the one or more crops identified from the one or more satellite images and provided by a farmer to a bank is same then value=1 is assigned, else value=2 is assigned;
estimating, via the one or more hardware processors, temporal health of each of the one or more crops using the one or more obtained satellite images based on the identified type, wherein for each time instance, when the one or more satellite images are available, number of indices including Normalized Difference Vegetation Index (NDVI) are estimated from the one or more satellite images and the temporal health of each of the one or more crops has a score between 0 and 1 where 0 indicates poor health and 1 indicates ideal health, and wherein the score is estimated using a field boundary available for a target plot, the NDVI for the target plot is obtained and compared with an average of the NDVI for the same crop from a surrounding region;

obtaining, via the one or more hardware processors, information pertaining to agroclimatic (AC) zone, and natural calamity from one or more sources;

estimating, via the one or more hardware processors, crop losses for each of the one or more crops based on value associated with occurrence of the natural calamity;

estimating, via the one or more hardware processors, yield for each of the one or more crops based on at least one or more satellite images, and weather data being obtained;

computing, via the one or more hardware processors, a first score as a function of the type of the one or more crops, the temporal health, the agroclimatic (AC) zone, the natural calamity, the crop losses, the estimated yield, and associated market returns being obtained;

detecting, via the one or more hardware processors, the one or more crops as one of (i) a first non-performing asset type, or (ii) a second non-performing asset type based on the computed first score, wherein the first non-performing asset type is a disguised Non-Performing Asset (NPA) and the second non-performing asset type is a non-disguised NPA, and wherein if the computed first score is more than 0.5, then assign score=1 which indicates the non-disguised NPA and if the computed first score is less than 0.5, then assign score=0 which indicates the disguised NPA; and periodically performing, via the one or more hardware processors, the steps of:

monitoring growth of the one or more crops based on at least one of the one or more satellite images and sensory information obtained from one or more sensors;

monitoring crop protocol associated with the one or more crops, wherein the crop protocol comprises dynamically generated instructions for cultivating the one or more crops, wherein the instructions are empirically determined and generated based on image processing of the one or more satellite images, historical pattern learnt over a period of time, wherein the instructions are in the form of advice wherein with each of monitored parameters, personalized advice are provided to farmers including (i) crop health wherein based on the crop health of fields, which portions of the fields (locations/hotspots) needs monitoring, (ii) pest/disease detection wherein based on detected pest/disease and its severity, which chemicals/pesticides to use along with quantity, and (iii) soil moisture sensors based on actual soil moisture measurement, suggestions on when and how to irrigate, wherein based on number of advices followed by the farmers an advice score is generated, wherein the crop protocol include feedback and the feedback include (a) how the activities are performed, (b) based on satellite image data, identifying if the farmer has taken certain measures to minimize/remove hotspots, (c) using hyperspectral data identifying if the advice on pest/disease has been followed or any further feedback is to be provided and (d) identification if irrigation was provided at right time and with required quantity, and wherein the steps of monitoring the growth of the one or more crops and monitoring the crop protocol are performed and updated at periodic time intervals.

2. The processor implemented method of claim 1, further comprising:

periodically performing the steps of:

estimating an expected yield for each of the one or more crops based on at least one of (i) the one or more satellite images, (ii) weather data, (iii) associated soil information, and (iv) associated crop information; and computing a second score as a function of at least one of (i) the monitored growth, (ii) the monitored crop protocol, and (iii) the estimated expected yield.

3. The processor implemented method of claim 2, wherein the second score is further based on (i) crop losses due to natural calamity, and (ii) expected return derived from the estimated expected yield.

4. The processor implemented method of claim 2, further comprising predicting the one or more crops as a potential non-performing asset based on the second score.

5. A system, comprising:

a memory storing instructions;

one or more communication interfaces; and one or more hardware processors coupled to the memory via the one or more communication interfaces, wherein the one or more hardware processors are configured by the instructions to:

obtain one or more satellite images corresponding to one or more crops;

identify a type of the one or more crops cultivated on a specific land based on the one or more satellite images using one or more machine learning (ML) or deep learning (DL) algorithms, wherein the one or more ML or DL algorithms are trained with a dataset of the one or more satellite images where the one or more crops in the dataset are identified and annotated, wherein specific pixels in the dataset of the one or more satellite images are identified to train the one or more ML or DL algorithms to identify the type of the one or more crops cultivated in the specific pixels, and wherein if the type of the one or more crops identified from the one or more satellite images and provided by a farmer to a bank is same then value=1 is assigned, else value=2 is assigned;

estimate temporal health of each of the one or more crops using the one or more obtained satellite images based on the identified type, wherein for each time instance, when the one or more satellite images are available, number of indices including Normalized Difference Vegetation Index (NDVI) are estimated from the one or more satellite images and the temporal health of each of the one or more crops has a score between 0 and 1 where 0 indicates poor health and 1 indicates ideal health, and wherein the score is estimated using a field boundary available for a target plot, the NDVI for the target plot is obtained and compared with an average of the NDVI for the same crop from a surrounding region;

obtain information pertaining to agroclimatic (AC) zone, and natural calamity from one or more sources;

estimate crop losses for each of the one or more crops based on value associated with occurrence of the natural calamity;

estimate yield for each of the one or more crops based on at least one or more satellite images, and weather data being obtained;

compute a first score as a function of the type of the one or more crops, the temporal health, the agroclimatic (AC) zone, the natural calamity, the crop losses, the estimated yield, and associated market returns being obtained;

detect the one or more crops as one of (i) a first non-performing asset type, or (ii) a second non-performing asset type based on the computed first score, wherein the first non-performing asset type is a disguised Non-Performing Asset (NPA) and the second non-performing asset type is a non-disguised NPA, and wherein if the computed first score is more than 0.5, then assign score=1 which indicates the non-disguised NPA and if the computed first score is less than 0.5, then assign score=0 which indicates the disguised NPA; and periodically performing, via the one or more hardware processors, the steps of:

monitoring growth of the one or more crops based on at least one of the one or more satellite images and sensory information obtained from one or more sensors;

monitoring crop protocol associated with the one or more crops, wherein the crop protocol comprises dynamically generated instructions for cultivating the one or more crops, wherein the instructions are empirically determined and generated based on image processing of the one or more satellite images, historical pattern learnt over a period of time, wherein the instructions are in the form of advice wherein with each of monitored parameters, personalized advice are provided to farmers including (i) crop health wherein based on the crop health of fields, which portions of the fields (locations/hotspots) needs monitoring, (ii) pest/disease detection wherein based on detected pest/disease and its severity, which chemicals/pesticides to use along with quantity, and (iii) soil moisture sensors based on actual soil moisture measurement, suggestions on when and how to irrigate, wherein based on number of advices followed by the farmers an advice score is generated, wherein the crop protocol include feedback and the feedback include (a) how the activities are performed, (b) based on satellite image data, the system identifies if the farmer has taken certain measures to minimize/remove hotspots, (c) using hyperspectral data the system identifies if the advice on pest/disease has been followed or any further feedback is to be provided and (d) identification by the system if irrigation was provided at right time and with required quantity, and wherein the steps of monitoring the growth of the one or more crops and monitoring the crop protocol are performed and updated at periodic time intervals.

6. The system of claim 5, wherein the one or more hardware processors are further configured by the instructions to: periodically perform the steps of:

estimating an expected yield for each of the one or more crops based on at least one of (i) the one or more satellite images, (ii) weather data, (iii) associated soil information, and (iv) associated crop information; and computing a second score as a function of at least one of (i) the monitored growth, (ii) the monitored crop protocol, and (iii) the estimated expected yield.

7. The system of claim 6, wherein the second score is further based on (i) crop losses due to natural calamity, and (ii) expected return derived from the estimated expected yield.

8. The system of claim 6, wherein the one or more hardware processors are further configured by the instructions to predict the one or more crops as a potential non-performing asset based on the second score.

9. One or more non-transitory machine-readable information storage mediums comprising one or more instructions which when executed by one or more hardware processors cause:

obtaining one or more satellite images corresponding to one or more crops;

identifying a type of the one or more crops cultivated on a specific land based on the one or more satellite images using one or more machine learning (ML) or deep learning (DL) algorithms, wherein the one or more ML or DL algorithms are trained with a dataset of the one or more satellite images where the one or more crops in the dataset are identified and annotated, wherein specific pixels in the dataset of the one or more satellite images are identified to train the one or more ML or DL algorithms to identify the type of the one or more crops cultivated in the specific pixels, and wherein if the type of the one or more crops identified from the one or more satellite images and provided by a farmer to a bank is same then value=1 is assigned, else value=2 is assigned;

estimating temporal health of each of the one or more crops using the one or more obtained satellite images based on the identified type, wherein for each time instance, when the one or more satellite images are available, number of indices including Normalized Difference Vegetation Index (NDVI) are estimated from the one or more satellite images and the temporal health of each of the one or more crops has a score between 0 and 1 where 0 indicates poor health and 1 indicates ideal health, and wherein the score is estimated using a field boundary available for a target plot, the NDVI for the target plot is obtained and compared with an average of the NDVI for the same crop from a surrounding region;

obtaining information pertaining to agroclimatic (AC) zone, and natural calamity from one or more sources;

estimating crop losses for each of the one or more crops based on value associated with occurrence of the natural calamity;

estimating yield for each of the one or more crops based on at least one or more satellite images, and weather data being obtained;

computing a first score as a function of the type of the one or more crops, the temporal health, the agroclimatic (AC) zone, the natural calamity, the crop losses, the estimated yield, and associated market returns being obtained;

detecting the one or more crops as one of (i) a first non-performing asset type, or (ii) a second non-performing asset type based on the computed first score, wherein the first non-performing asset type is a disguised Non-Performing Asset (NPA) and the second non-performing asset type is a non-disguised NPA, and wherein if the computed first score is more than 0.5, then assign score=1 which indicates the non-disguised NPA and if the computed first score is less than 0.5, then assign score=0 which indicates the disguised NPA; and periodically performing, via the one or more hardware processors, the steps of:

monitoring growth of the one or more crops based on at least one of the one or more satellite images and sensory information obtained from one or more sensors;

monitoring crop protocol associated with the one or more crops, wherein the crop protocol comprises dynamically generated instructions for cultivating the one or more crops, wherein the instructions are empirically determined and generated based on image processing of the one or more satellite images, historical pattern learnt over a period of time, wherein the instructions are in the form of advice wherein with each of monitored parameters, personalized advice are provided to farmers including (i) crop health wherein based on the crop health of fields, which portions of the fields (locations/hotspots) needs monitoring, (ii) pest/disease detection wherein based on detected pest/disease and its severity, which chemicals/pesticides to use along with quantity, and (iii) soil moisture sensors based on actual soil moisture measurement, suggestions on when and how to irrigate, wherein based on number of advices followed by the farmers an advice score is generated, wherein the crop protocol include feedback and the feedback include (a) how the activities are performed, (b) based on satellite image data, a system identifies if the farmer has taken certain measures to minimize/remove hotspots, (c) using hyperspectral data the system identifies if the advice on pest/disease has been followed or any further feedback is to be provided and (d) identification by the system if irrigation was provided at right time and with required quantity, and wherein the steps of monitoring the growth of the one or more crops and monitoring the crop protocol are performed and updated at periodic time intervals.

10. The one or more non-transitory machine-readable information storage mediums of claim 9, wherein the one or more instructions which when executed by the one or more hardware processors further cause: periodically performing the steps of:

estimating an expected yield for each of the one or more crops based on at least one of (i) the one or more satellite images, (ii) weather data, (iii) associated soil information, and (iv) associated crop information; and computing a second score as a function of at least one of (i) the monitored growth, (ii) the monitored crop protocol, and (iii) the estimated expected yield.

11. The one or more non-transitory machine-readable information storage mediums of claim 10, wherein the second score is further based on (i) crop losses due to natural calamity, and (ii) expected return derived from the estimated expected yield.

12. The one or more non-transitory machine-readable information storage mediums of claim 10, wherein the one or more instructions which when executed by the one or more hardware processors further cause predicting the one or more crops as a potential non-performing asset based on the second score.

* * * * *